United States Patent [19]
Tran

[11] Patent Number: 5,864,689
[45] Date of Patent: *Jan. 26, 1999

[54] MICROPROCESSOR CONFIGURED TO SELECTIVELY INVOKE A MICROCODE DSP FUNCTION OR A PROGRAM SUBROUTINE IN RESPONSE TO A TARGET ADDRESS VALUE OF BRANCH INSTRUCTION

[75] Inventor: Thang M. Tran, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 567,666

[22] Filed: Dec. 5, 1995

[51] Int. Cl.[6] .................................................... G06F 9/32
[52] U.S. Cl. ........................ 395/384; 395/387; 395/589; 395/590
[58] Field of Search ................... 395/421.05, 421.07, 395/421.09, 800.23, 384, 571, 588, 590, 589, 385, 387, 595, 568; 711/202, 208, 209, 215

[56] References Cited

U.S. PATENT DOCUMENTS

| | | | |
|---|---|---|---|
| 4,631,663 | 12/1986 | Chilinski et al. | 395/570 |
| 4,862,407 | 8/1989 | Fette et al. | 395/800.35 |
| 5,155,819 | 10/1992 | Watkins et al. | 395/800.36 |
| 5,193,161 | 3/1993 | Bealkowski et al. | 711/206 |
| 5,222,244 | 6/1993 | Carbine et al. | 395/800.41 |
| 5,311,458 | 5/1994 | Haines et al. | 364/736 |
| 5,677,859 | 10/1997 | Kanayama et al. | 395/562 |
| 5,729,728 | 3/1998 | Colwell et al. | 395/581 |

OTHER PUBLICATIONS

Computer Architecture: A Quantitative Approach, John L. Hennessy, David A. Patterson, Morgan Kaufmann Publishers Inc., San Mateo, CA (1990), pp. 208–214.

*Primary Examiner*—Parshotam S. Lall
*Assistant Examiner*—Viet Vu
*Attorney, Agent, or Firm*—Conley, Rose & Tanyon, PC; B. Noel Kivlin

[57] ABSTRACT

A microprocessor having a microcode unit is provided. Routines comprising DSP functions and instruction emulation routines are stored within a read-only memory within the microcode unit. The routines may be fetched by the microprocessor upon occurrence of a corresponding instruction. For example, DSP functions may be fetched upon occurrence of an instruction defined by the microprocessor to be indicative of a DSP function. The microcode unit provides a library of useful functions. Effectively, the instruction set executed by the microprocessor is increased. A number of methods for defining instructions indicative of a DSP function are contemplated. For example, a subroutine call instruction having a target address within a predefined range of addresses may be defined as indicative of a DSP function. Alternatively, a special subroutine call instruction may be added to the instruction set. Detection of the special subroutine call instruction encoding causes the microprocessor to fetch instructions from the microcode unit. A third alternative is to detect data patterns in data movement instructions and cause instructions to be fetched from the microcode unit upon occurrence of particular data patterns.

11 Claims, 5 Drawing Sheets

MICROPROCESSOR CONFIGURED TO SELECTIVELY INVOKE A MICROCODE DSP FUNCTION OR A PROGRAM SUBROUTINE IN RESPONSE TO A TARGET ADDRESS VALUE OF BRANCH INSTRUCTION

BACKGROUND OF THE INVENTION

1. Field of the Invention

This invention relates to the field of microprocessors and, more particularly, to a read-only memory storing DSP functions within a microprocessor.

2. Description of the Relevant Art

Computer systems employ one or more microprocessors, and often employ digital signal processors (DSPs). The DSPs are typically included within multimedia devices such as sound cards, speech recognition cards, video capture cards, etc. The DSPs function as coprocessors, performing complex and repetitive mathematical computations demanded by multimedia devices and other signal processing applications more efficiently than general purpose microprocessors. Microprocessors are typically optimized for performing integer operations upon values stored within a main memory of a computer system. While DSPs perform many of the multimedia functions, the microprocessor manages the operation of the computer system.

Digital signal processors include execution units which comprise one or more arithmetic logic units (ALUs) coupled to hardware multipliers which implement complex mathematical algorithms in a pipelined manner. The instruction set primarily comprises DSP-type instructions (i.e. instructions optimized for the performance of complex mathematical operations) and also includes a small number of non-DSP instructions. The non-DSP instructions are in many ways similar to instructions executed by microprocessors, and are necessary for allowing the DSP to function independent of the microprocessor.

The DSP is typically optimized for mathematical algorithms such as correlation, convolution, finite impulse response (FIR) filters, impulse response (IR) filters, Fast Fourier Transforms (FFTs), matrix correlations, and inner products, among other operations. Implementations of these mathematical algorithms generally comprise long sequences of systematic arithmetic/multiplicative operations. These operations are interrupted on various occasions by decision-type commands. In general, the DSP sequences are a repetition of a very small set of instructions that are executed 70% to 90% of the time. The remaining 10% to 30% of the instructions are primarily boolean/decision operations. Many of these mathematical algorithms perform a repetitive multiply and accumulate function in which a pair of operands are multiplied together and added to a third operand. The third operand is often used to store an accumulation of prior multiplications. Therefore, DSP hardware often includes hardware configured to quickly perform a multiply-add sequence. An exemplary DSP is the ADSP 2171 available from Analog Devices, Inc. of Norwood, Mass.

As microprocessors continue to increase in performance due to increases in operating frequency and the number of transistors which may be included within a single semiconductor substrate, it becomes desirable to perform certain DSP functions within the microprocessor. Instruction code written in the x86 instruction set, for example, may perform the mathematical operations that DSPs typically perform. Cost of the computer system may be reduced through the elimination of one or more DSPs while still performing equivalent functionality. Unfortunately, the instruction code written for the microprocessor may not be as efficient at performing the operations as DSP instruction code. In particular, a larger number of instructions may be necessary to perform the equivalent functionality. The amount of memory needed to store the program may be deleteriously increased. An increase in the amount of memory needed to store the program may lead to decreased overall performance. For example, in a multi-tasking operating system, less memory is available for other programs due to the increased size of a DSP program. It is desirable to perform DSP functionality within a microprocessor without increasing the memory used to store the program.

SUMMARY OF THE INVENTION

The problems outlined above are in large part solved by a microprocessor having a microcode unit in accordance with the present invention. Routines comprising DSP functions and instruction emulation routines are stored within a read-only memory within the microcode unit. The routines may be fetched by the microprocessor upon occurrence of a corresponding instruction. For example, DSP functions may be fetched upon occurrence of an instruction defined by the microprocessor to be indicative of a DSP function. Advantageously, the DSP functions are stored within the microprocessor. Programs need not contain instructions which perform the DSP functions, and may thereby occupy less memory. Performance of a computer system including the microprocessor may be advantageously increased due to the smaller amount of memory occupied by the program. Furthermore, programs utilizing DSP functions may be more easily created. The DSP functions may simply be called by the program as opposed to a programmer having to explicitly code the corresponding routines. Since the DSP functions are available for the programmer's use, development of a particular program may proceed more rapidly than would be achievable upon a computer system not providing the DSP functions.

The microcode unit provides a library of useful functions. Effectively, the instruction set executed by the microprocessor is increased. The added "instructions" perform a particular DSP function, often a much more complicated function than that performed by more typical instructions. A program may employ one or more of the library of functions according to the needs of the program.

A number of methods for defining instructions indicative of a DSP function are contemplated. For example, a subroutine call instruction having a target address within a predefined range of addresses may be defined as indicative of a DSP function. Alternatively, a special subroutine call instruction may be added to the instruction set. Detection of the special subroutine call instruction encoding causes the microprocessor to fetch instructions from the microcode unit. A third alternative is to detect data patterns in data movement instructions and cause instructions to be fetched from the microcode unit upon occurrence of particular data patterns. An appropriate method may be selected for a particular microprocessor such that the method is easily integrated into programs for which the microcode functions are intended.

Broadly speaking, the present invention contemplates a method for performing a DSP function in a microprocessor comprising several steps. A plurality of instructions comprising the DSP function are stored in a read-only memory configured within the microprocessor. An instruction indicative of the DSP function is decoded. The plurality of instructions are retrieved from the read-only memory in response to the decoding of the instruction. The plurality of instructions are then executed by the microprocessor.

The present invention further contemplates a microcode unit for a microprocessor, comprising a read-only memory, a sequencer, and an entry point generator. The read-only memory is configured to store a plurality of routines. Each of the plurality of routines comprises at least one instruction, and at least one of the plurality of routines comprises a DSP function. Coupled to the read-only memory, the sequencer is configured to fetch instructions from the read-only memory for execution by at least one execute unit. The entry point generator is coupled to the sequencer and is configured to generate an entry point corresponding to one of the plurality of routines upon receipt of an indication of an instruction upon a bus coupled to an instruction decode unit.

The present invention still further contemplates a microprocessor comprising an instruction decode unit, a microcode unit, and a plurality of execute units. The instruction decode unit is configured to decode an instruction indicative of a DSP function. The microcode unit, coupled to receive an indication of the instruction from the instruction decode unit, is configured to fetch one of a plurality of routines stored within the microcode unit in response to the indication. The plurality of execute units are coupled to receive a plurality of instructions comprising one of the plurality of routines from the microcode unit. The plurality of execute units are configured to execute instructions.

BRIEF DESCRIPTION OF THE DRAWINGS

Other objects and advantages of the invention will become apparent upon reading the following detailed description and upon reference to the accompanying drawings in which.

Figure 1:
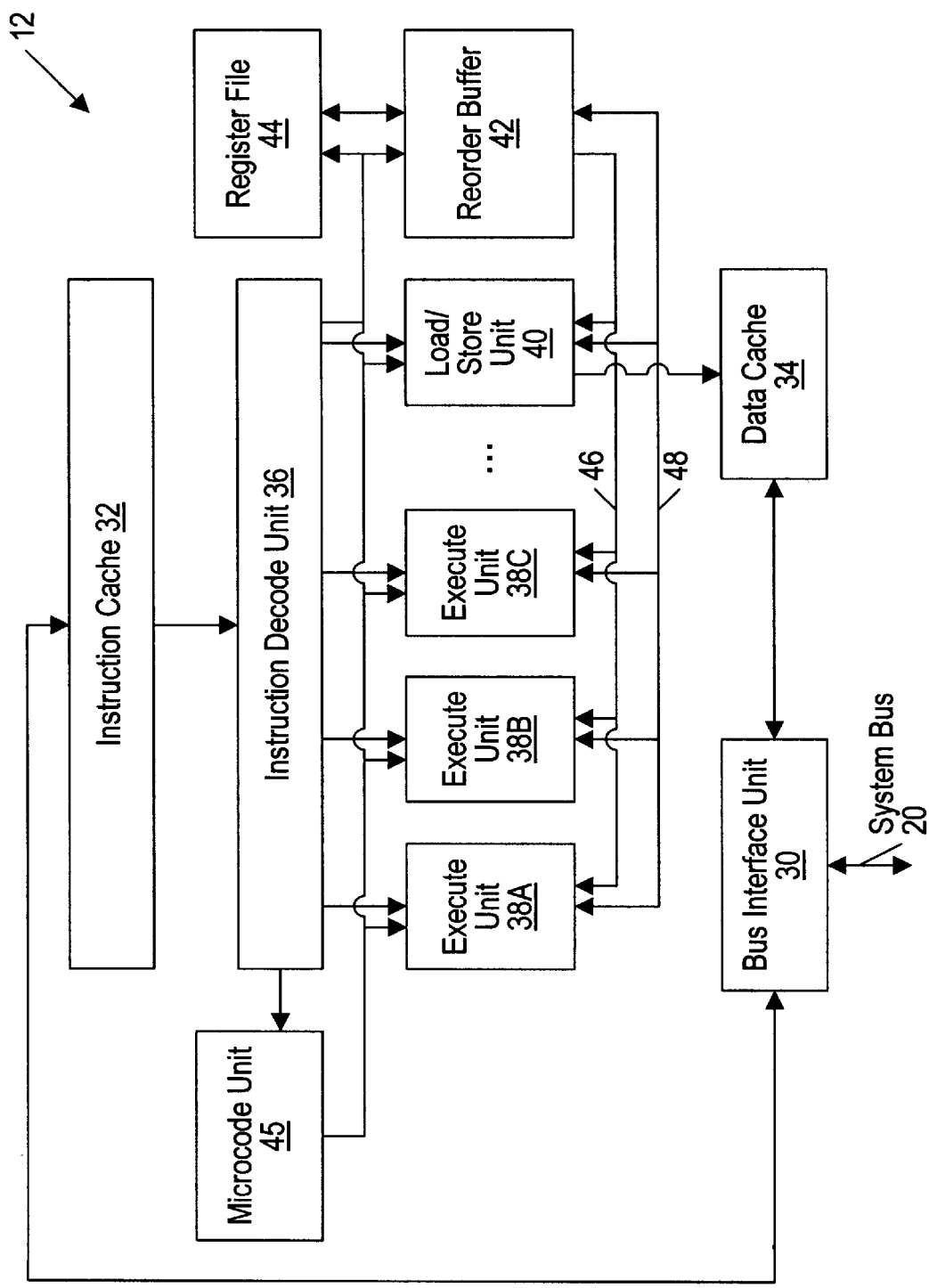
FIG. 1 is a block diagram of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 12 is shown. Microprocessor 12 includes a bus interface unit 30, an instruction cache 32, a data cache 34, an instruction decode unit 36, a plurality of execute units including execute units 38A, 38B and 38C, a load/store unit 40, a reorder buffer 42, a register file 44, and an microcode unit 45. The plurality of execute units will be collectively referred to herein as execute units 38, and may include more execute units than execute units 38A, 38B, and 38C shown in FIG. 2. Additionally, an embodiment of microprocessor 12 may include one execute unit 38. Bus interface unit 30 is coupled to instruction cache 32, data cache 34, and a system bus 20. Instruction cache 32 is coupled to instruction decode unit 36, which is further coupled to execute units 38, reorder buffer 42, and load/store unit 40. Reorder buffer 42, execute units 38, data cache 34, and load/store unit 40 are each coupled to a result bus 48 for forwarding of execution results. Load/store unit 40 is coupled to data cache 34. Finally, microcode unit 45 is coupled to instruction decode unit 36, execute units 38, load/store unit 40, reorder buffer 42, and register file 44.

Generally speaking, microcode unit 45 stores routines corresponding to DSP functions. Instruction decode unit 36 decodes instructions which microprocessor 12 defines as indicative of a DSP function, and conveys an indication of such instructions to microcode unit 45. Microcode unit 45 includes a read-only memory which stores the routines. Microcode unit 45 fetches instructions that correspond to a routine which performs the indicated DSP function from the read-only memory. Advantageously, routines which perform DSP functions are included within microcode unit 45. The routines do not require storage space in main memory, and so DSP functionality may be performed by microprocessor 12 without a corresponding increase in memory required to store the program.

Instructions fetched by microcode unit 45 are conveyed to execute units 38 and load/store unit 40. Additionally, register operands accessed by the instructions are requested from reorder buffer 42 and register file 44. The operands are conveyed to the units receiving the instructions. It is noted that while microcode unit 45 is fetching and dispatching instructions, instruction decode unit 36 stalls (i.e. stops dispatching instructions). More particularly, instruction decode unit 36 stalls upon detection of an instruction to be performed by microcode unit 45, and begins fetching and dispatching instructions again once microcode unit 45 indicates that the routine corresponding to that instruction has completed dispatch.

In one embodiment, microprocessor 12 defines subroutine call instructions having target addresses within a particular range of addresses to be indicative of DSP functions. A "subroutine call instruction" is a branch instruction which stores the address of the following instruction within a predefined storage location. Instructions residing at the target address of the subroutine call instruction are executed until a corresponding subroutine return instruction is executed. The subroutine return instruction, also a branch instruction, causes instruction execution to continue at the address stored by the subroutine call instruction. Exemplary subroutine call and return instructions are the CALL and RET instructions of the x86 instruction set. For this embodiment, instruction decode unit 36 includes decoding circuitry for detecting the subroutine call instructions having target addresses within the specified range, and circuitry for routing the target address to microcode unit 45 upon detecting such instructions. Microcode unit 45 identifies the requested function from the target address. In another embodiment, a special call instruction encoding is added to the instruction set recognized by microprocessor 12. The special encoding is indicative of a DSP function and the associated target address identifies the routine in microcode unit 45.

In another embodiment of microprocessor 12 employing the x86 microprocessor architecture, MOV instructions having a particular data pattern are defined as indicative of DSP instruction. Instruction decode unit 36 detects the data patterns in the MOV instruction and routes the data to microcode unit 45. Microcode unit 45 identifies the routine to be executed from the received data.

As used herein, the term "routine" refers to an instruction sequence comprising one or more instructions stored within microcode unit 45. Two types of routines are defined. First, instruction emulation routines are routines which perform the operation defined for a particular instruction by the microprocessor architecture to which microprocessor 12 is implemented. A microprocessor architecture defines the features and operations a microprocessor is required to perform in order to be compatible with the microprocessor architecture. System designers and programmers may use the microprocessor architecture as a definition of much of the functionality of microprocessors which are compatible with the microprocessor architecture. Included in the microprocessor architecture is the memory model, as well as an instruction set. An "instruction set" comprises one or more instructions, each instruction having a defined operation or operations. Each instruction is assigned a particular encoding of bits, such that the instruction may be differentiated from other instructions within the instruction set. Logic circuits within the microprocessor recognize the encodings and perform the corresponding operations. The x86 microprocessor architecture, for example, specifies instructions which are quite complex. Some of the more complex instructions are infrequently used by programs written using the x86 instruction set. Instead of including execute units 38 which include hardware sufficient for executing the seldom-used complex instructions, microprocessor 12 defines instruction emulation routines for these instructions. The routines include simpler instructions which, taken together, perform the complex operation. Advantageously, execute units 38 may be simpler units, often occupying less silicon area and operating faster than the more complex units employed to execute the complex operations directly. An instruction emulation routine can be seen therefore, to perform the operations attributable to one particular instruction within a program being executed by microprocessor 12.

A second type of routine stored within microcode unit 45 is referred to herein as a "function". A function comprises a plurality of instructions which perform an operation which is not attributable to any one particular instruction within the instruction set employed by microprocessor 12. The operation performed by the function may instead be the calculation of a complex mathematical algorithm, such as the algorithms involved in DSP operations. Microcode unit 45 includes one or more DSP functions, wherein a DSP function is defined to include one or more of the following: correlation, convolution, finite impulse response (FIR) filters, impulse response (IR) filters, Fast Fourier Transforms (FFTs), matrix correlations, and inner products. By including functions in microcode unit 45, the capabilities of microprocessor 12 are increased without expanding the instruction set executed by microprocessor 12. A programmer utilizing a computer system employing microprocessor 12 may code programs more easily by taking advantage of the functions included within microprocessor 12.

In one embodiment, certain ones of execute units 38 are configured to not only execute instructions from the instruction set employed by microprocessor 12, but to also execute instructions from a second instruction set. Microcode unit 45 may store instructions from either instruction set. However, instruction decode unit 36 is configured to decode instructions only from the instruction set employed by microprocessor 12. In one particular embodiment, the instruction set employed by microprocessor 12 comprises the x86 instruction set while the second instruction set comprises the ADSP 2171 instruction set. The second instruction set may be used by DSP functions to more efficiently perform the DSP operation.

Other portions of microprocessor 12 will now be described. Instruction cache 32 is a high speed cache memory for storing instructions. It is noted that instruction cache 32 may be configured into a set-associative or direct mapped configuration. Instruction cache 32 may additionally include a branch prediction mechanism for predicting branch instructions as either taken or not taken. Instructions are fetched from instruction cache 32 and conveyed to instruction decode unit 36 for decode and dispatch to an execute unit 38 or load/store unit 40.

Instruction decode unit 36 decodes instructions. As used herein, "decoding" refers to transforming the instruction from the format defined by the microprocessor architecture employed by microprocessor 12 into a second format expected by execute units 38. Often, the second format comprises decoded control signals for controlling data flow elements such as adders and multiplexors in order to perform the operation the instruction defines. In the embodiment shown, instruction decode unit 36 decodes each instruction fetched from instruction cache 32. Instruction decode unit 36 dispatches the instruction to execute units 38 and/or load/store unit 40. Instruction decode unit 36 also detects the register operands used by the instruction and requests these operands from reorder buffer 42 and register file 44. In one embodiment, execute units 38 are symmetrical execution units. Symmetrical execution units are each configured to execute a particular subset of the instruction set employed by microprocessor 12. The subsets of the instruction set executed by each of the symmetrical execution units are the same. In another embodiment, execute units 38 are asymmetrical execution units configured to execute dissimilar instruction subsets. For example, execute units 38 may include a branch execute unit for executing branch instructions, one or more arithmetic/logic units for executing arithmetic and logical instructions, and one or more floating point units for executing floating point instructions. Instruction decode unit 36 dispatches an instruction to an execute unit 38 or load/store unit 40 which is configured to execute that instruction.

Load/store unit 40 provides an interface between execute units 38 and data cache 34. Additionally, memory dependencies between load and store memory operations are detected and handled by load/store unit 40.

Execute units 38 and load/store unit 40 may include one or more reservation stations for storing instructions whose operands have not yet been provided. An instruction is selected from those stored in the reservation stations for execution if: (1) the operands of the instruction have been provided, and (2) the instructions which are prior to the instruction being selected have not yet received operands. It is noted that a centralized reservation station may be included instead of separate reservation stations. The centralized reservation station is coupled between instruction decode unit 36, execute units 38, and load/store unit 40. Such an embodiment may perform the dispatch function within the centralized reservation station.

Microprocessor 12 supports out of order execution, and employs reorder buffer 42 for storing execution results of speculatively executed instructions and for storing these results into register file 44 in program order; for performing dependency checking and register renaming; and for providing for mispredicted branch and exception recovery. When an instruction is decoded by instruction decode unit 36, requests for register operands are conveyed to reorder buffer 42 and register file 44. In response to the register operand requests, one of three values is transferred to the execute unit 3E and/or load/store unit 40 which receives the instruction: (1) the value stored in reorder buffer 42, if the value has been speculatively generated; (2) a tag identifying a location within reorder buffer 42 which will store the result, if the value has not been speculatively generated; or (3) the value stored in the register within register file 44, if no instructions within reorder buffer 42 modify the register. Additionally, a storage location within reorder buffer 42 is allocated for storing the results of the instruction being decoded by instruction decode unit 36. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register. Tags and/or operand values are conveyed upon an operand tags/value bus 46. It is further noted that register operand requests from microcode unit 45 are handled similarly.

When execute units 38 or load/store unit 40 execute an instruction, the tag assigned to the instruction by reorder buffer 42 is conveyed upon result bus 48 along with the result of the instruction. Reorder buffer 42 stores the result in the indicated storage location. Additionally, execute units 38 and load/store unit 40 compare the tags conveyed upon result bus 48 with tags of operands for instructions stored therein. If a match occurs, the unit captures the result from result bus 48 and stores it with the corresponding instruction. In this manner, an instruction may receive the operands it is intended to operate upon. Capturing results from result bus 48 for use by instructions is referred to as "result forwarding".

Instruction results are stored into register file 44 by reorder buffer 42 in program order. Storing the results of an instruction and deleting the instruction from reorder buffer 42 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 42 discards the instructions subsequent to the mispredicted branch instruction or the instruction causing the exception. Instructions thus discarded are also flushed from execute units 38, load/store unit 40, and instruction decode unit 36.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146, 382, filed Oct. 29, 1993 by Witt, et al, now abandoned. These documents are incorporated herein by reference in their entirety.

Register file 44 includes storage locations for each register defined by the microprocessor architecture employed by microprocessor 12. For example, microprocessor 12 may employ the x86 microprocessor architecture. For such an embodiment, register file 44 includes locations for storing the EAX, EBX, ECX, EDX, ESI, EDI, ESP, and EBP register values.

Bus interface unit 30 is configured to effect communication between microprocessor 12 and devices coupled to system bus 20. For example, instruction fetches which miss instruction cache 32 may be transferred from main memory 16 by bus interface unit 30. Similarly, memory operations performed by load/store unit 40 which miss data cache 34 may be transferred from main memory 16 by bus interface unit 30. Additionally, data cache 34 may discard a cache line of data which has been modified by microprocessor 12. Bus interface unit 30 transfers the modified line to main memory 16.

It is noted that instruction decode unit 36 may be configured to dispatch an instruction to more than one execution unit. For example, in embodiments of microprocessor 12 which employ the x86 microprocessor architecture, certain instructions may operate upon memory operands. Executing such an instruction involves transferring the memory operand from data cache 34, executing the instruction, and transferring the result to memory (if the destination operand is a memory location). Load/store unit 40 performs the memory transfers, and an execute unit 38 performs the execution of the instruction. It is further noted that instruction decode unit 36 may be configured to decode multiple instructions per clock cycle. In one embodiment, instruction decode unit 36 is configured to decode and dispatch up to one instruction per execute unit 38 and load/store unit 40 per clock cycle.

Figure 2:
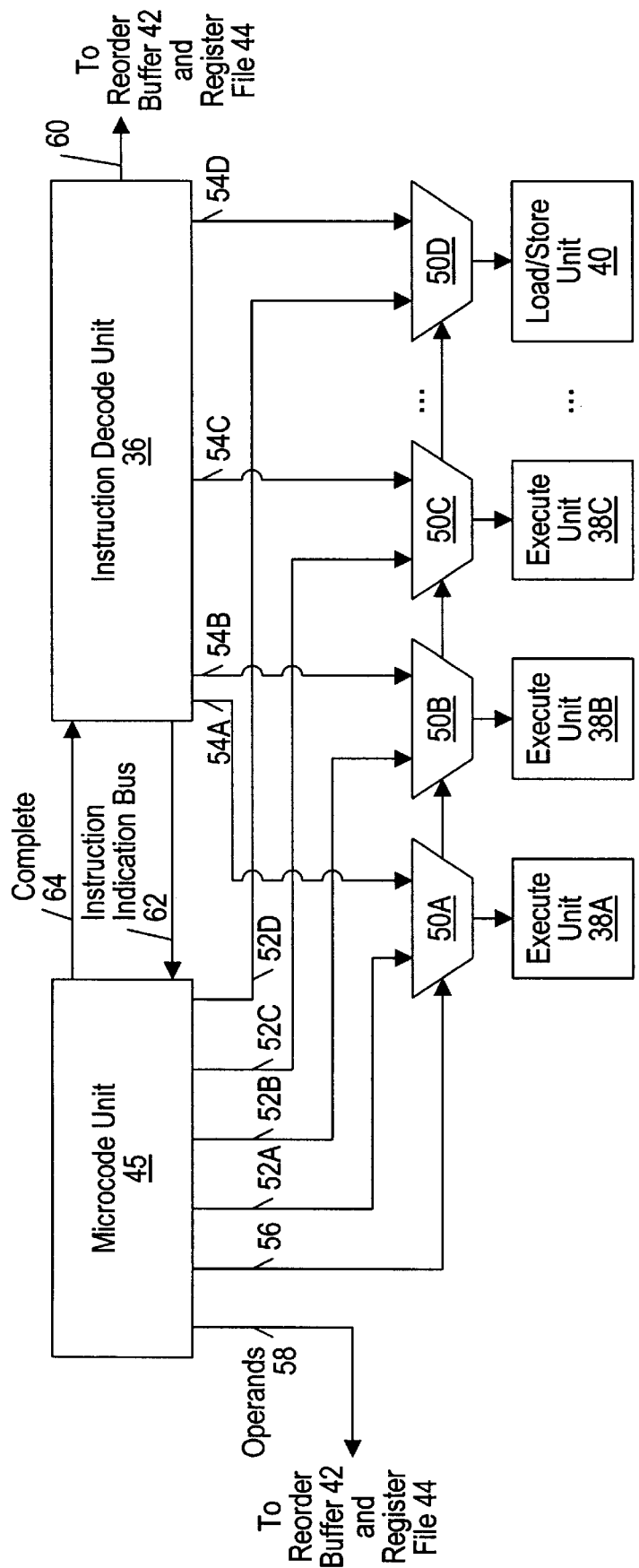
FIG. 2 is a diagram of portions of the microprocessor shown in FIG. 1, highlighting interconnections between the portions according to one embodiment of the microprocessor.

Turning now to FIG. 2, a block diagram of portions of microprocessor 12 according to the embodiment shown in FIG. 1 are shown. FIG. 2 depicts certain interconnections between the blocks shown in FIG. 2 according to one embodiment of microprocessor 12. Instruction decode unit 36, microcode unit 45, execute units 38, and load/store unit 40 are included. Additionally, a plurality of multiplexors 50 (shown individually as multiplexors 50A, 50B, 50C, and 50D) are included. Multiplexor 50A is coupled to provide an instruction to execute unit 38A. Similarly, multiplexors 50B, 50C, and 50D are coupled to provide instructions to execute units 38B, 38C, and load/store unit 40, respectively. Each multiplexor 50 receives one of a plurality of microcode dispatch buses 52 (including microcode dispatch buses 52A, 52B, 52C, and 52D) and one of a plurality of decode dispatch buses 54 (including decode dispatch buses 54A, 54B, 54C, and 54D). A select line 56 emanating from microcode unit 45 is coupled as a select control to each of multiplexors 50. Microcode operands bus 58 and decode operands bus 60 are coupled between microcode unit 45 and instruction decode unit 36 (respectively) and reorder buffer 42 and register file 44. Finally, an instruction indication bus 62 and a complete line 64 are coupled between microcode unit 45 and instruction decode unit 36.

When instruction decode unit 36 detects an instruction corresponding to a routine within microcode unit 45, an indication of the instruction is transferred upon instruction indication bus 62 to microcode unit 45. Instruction indication bus 62 comprises conductors sufficient to convey an indication of any instruction which corresponds to a routine within microcode unit 45. Instruction decode unit 36 then stalls further instruction decode and dispatch until microcode unit 45 completes the corresponding routine, as indicated by an asserted signal upon complete line 64. It is noted that the indication of the instruction may comprise operands for the instruction as well as an indication of the instruction to be executed. Furthermore, the entire encoded or decoded instruction may comprise the indication, according to one embodiment. In other embodiments, the indication may comprise the target address of a subroutine call instruction or data associated with a MOV instruction, as noted above.

During times in which microcode unit 45 is idle, instruction decode unit 36 dispatches instructions to execute units 38 and load/store unit 40 upon decode dispatch buses 54. Associated register operands are requested from reorder buffer 42 and register file 44 upon decode operands bus 60. Similarly, during times in which microcode unit 45 is not idle, microcode unit 45 dispatches instructions upon microcode dispatch buses 52 and requests register operands via microcode operands bus 58. Microcode unit 45 further asserts or deasserts the select signal upon select line 56 based upon whether microcode unit 45 is active or idle, respectively. Microcode instructions or instructions from instruction decode unit 36 are thereby selected for execution by the receiving units. It is noted that operands are forwarded from reorder buffer 42 and register file 44 to the units receiving the associated instructions. Interconnection for this transfer is not shown in FIG. 2. It is noted that, although the output buses of multiplexors 50 are shown connected to a single execute unit 38 or load/store unit 40, another embodiment is contemplated in which the output buses are coupled to multiple units. In one particular embodiment, the output buses are coupled to each unit and the units select instructions from the output buses based upon information identifying the unit intended to receive the instruction. Such information is generated by instruction decode unit 36 or microcode unit 45 depending upon the instructions each unit is configured to execute, among other things.

Figure 3:
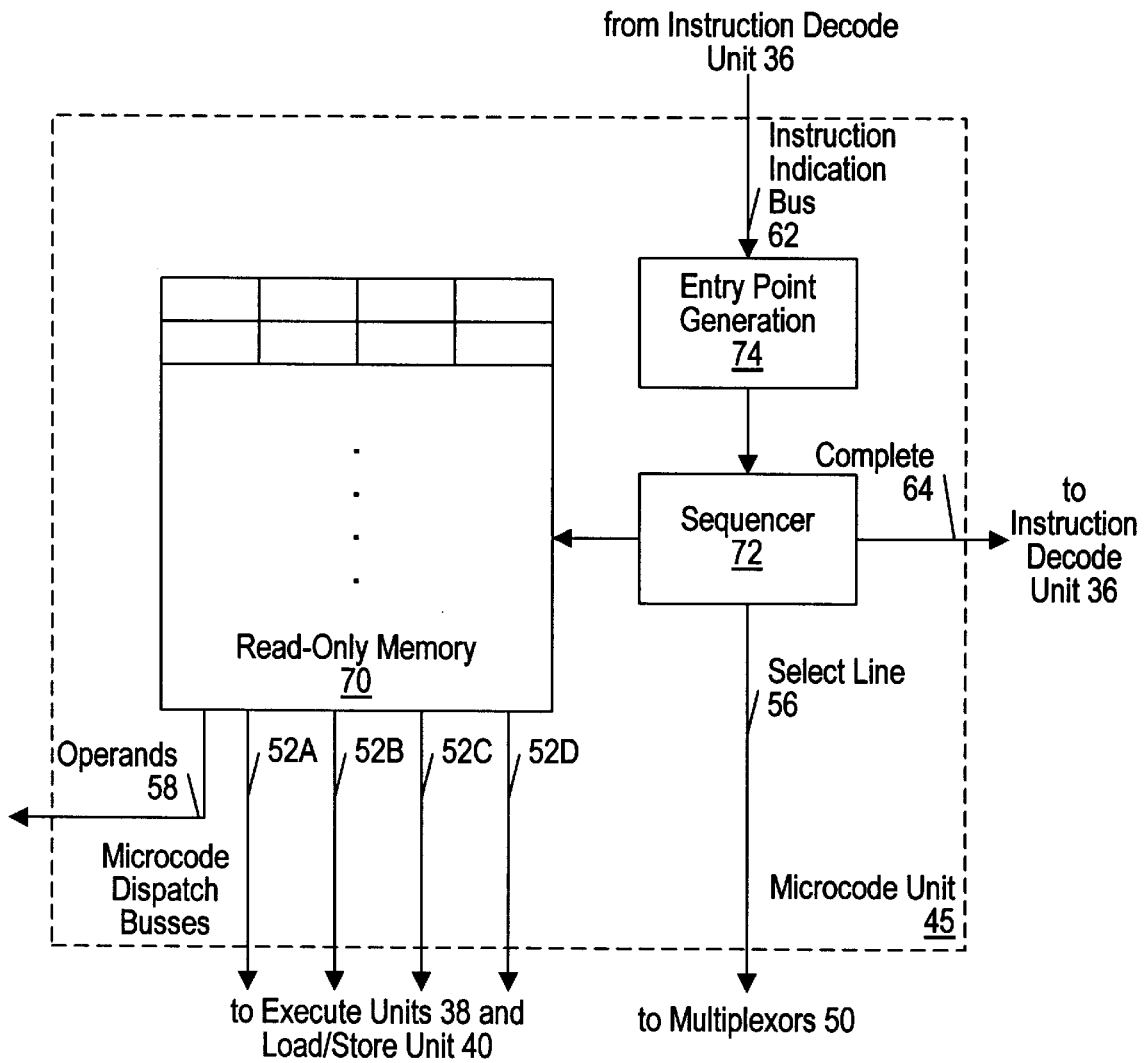
FIG. 3 is a diagram of a microcode unit included in one embodiment of the microprocessor shown in FIG. 1.

Turning next to FIG. 3, a block diagram of one embodiment of microcode unit 45 is shown. Microcode unit 45 includes a read-only memory 70, a sequencer unit 72, and an entry point generation circuit 74. Entry point generation circuit 74 is coupled to receive instruction indication bus 62, and is further coupled to sequencer 72. Sequencer 72 is coupled to complete line 64, select line 56, and read-only memory 70. Read-only memory 70 is further coupled to microcode dispatch buses 52, and operands bus 58.

Read-only memory 70 comprises a plurality of storage locations which store instructions in a substantially permanent fashion. Instructions may be accessed and transmitted from read-only memory 70, but the contents of read-only memory 70 are not readily modifiable. In one embodiment, the storage locations within read-only memory 70 are organized such that a plurality of instructions are conveyed upon microcode dispatch buses 52 for any given address presented by sequencer 72. The instructions are conveyed to respective execute and/or load/store units.

Since the instructions within a routine are stored permanently within read-only memory 70, the instructions may be organized within read-only memory 70 to best utilize the available execute and load/store units. In this manner, much of the dispatch circuitry included in instruction decode unit 36 may be eliminated from microcode unit 45. Instead, microcode unit 45 simply fetches from storage locations within read-only memory 70 which store instructions associated with a particular routine. If a stall occurs, the instructions fetched during the clock cycle are stalled. For example, a particular execution unit may be configured to receive a maximum of two instructions per clock cycle. Dispatch circuitry within instruction decode unit 36 guarantees that no more than two instructions are dispatched to the particular execution unit during a particular clock cycle. Similar circuitry can be eliminated from microcode unit 45 by storing instructions into read-only memory 70 such that no more than two instructions which are dispatched to the particular execution unit are fetched during a clock cycle.

It is noted that the operands may be stored within read-only memory 70 in a decoded format, such that the operand requests may be transmitted directly from read-only memory 70 upon microcode operands bus 58. Decode of the corresponding instructions is not required to determine the operands. Storing instructions in this manner is made possible by the permanent storage of a sequence of instructions within read-only memory 70.

Entry point generation circuit 74 generates an entry point into read-only memory 70 based on the instruction indication received upon instruct-on indication bus 62. As used herein, an "entry point" refers to an address for read-only memory 70. Instructions residing at the entry point address comprise the initial instructions of a routine. Entry point generation circuit 74 conveys the entry point to sequencer 72, which begins fetching instructions from read-only memory 70 at the entry point. In one embodiment, entry point generation circuit 74 generates an entry point according to a target address provided by instruction decode unit 36. Each target address is assigned a particular entry point at which the initial instructions of the corresponding routine are stored. In another embodiment, data patterns associated with MOV instructions are received by entry point generation circuit 74. Each data pattern which is indicative of a routine is assigned a unique entry point decoded by entry point generation circuit 74.

Sequencer 72 is configured to increment the entry point to form an address for fetching a subsequent group of instructions. The address thus formed is then incremented yet again to form additional fetch addresses. In one embodiment, sequencer 72 is configured to increment the address and fetch instructions a number of times before determining that the routine has been completely fetched and dispatched. The number is dependent upon the particular entry point, and is representative of the number of instructions within the routine stored at the entry point. In another embodiment, a particular instruction encoding is used to indicate the end of a routine. Sequencer 72 detects the particular encoding, and determines that the routine has been completely fetched based upon detection of the particular encoding. When sequencer 72 determines that the routine has been completely fetched and dispatched, the complete signal upon complete line 64 is dispatched. Sequencer 72 then returns to an idle state until a new entry point is presented by entry point generation circuit 74.

Often, DSP functions comprise a sequence of instructions repeated a number of times (i.e. a loop structure). In one embodiment, sequencer 72 is configured to support looping structures by repeatedly fetching and dispatching the instruction sequence comprising the DSP function from read-only memory 70. Sequencer 72 repeats the fetch and dispatch sequence the number of times that the loop executes. The ECX register of the x86 microprocessor architecture is often used to store loop iteration counts. Sequencer 72 receives the value stored in the ECX register in order to determine the number of times to fetch and dispatch the instruction sequence. Prior to calling the DSP function, the calling routine updates the ECX register with the loop iteration count. Sequencer 72 fetches and dispatches the instruction sequence the number of times specified by the loop iteration count or until the branch instruction forming the loop is mispredicted. Embodiments of microprocessor 12 which employ the move instruction to cause a DSP function to execute may use an immediate field within the move instruction to encode the loop count.

Sequencer 72 additionally includes circuitry for asserting the control signal upon control line 56. The control signal is asserted during times that sequencer 72 is not idle (i.e. during times in which microcode unit 45 is dispatching instructions and instruction decode unit 36 is stalled). During times that sequencer 72 is idle, the control signal is deasserted.

It is noted that the term "address", as used herein with respect to the embodiment of read-only memory 70 shown in FIG. 3, refers to a value identifying a set of storage locations within read-only memory 70. Unlike addresses in main memory, which refer to a byte of information, addresses in read-only memory 70 may correspond to multiple instructions which are concurrently fetched and dispatched to execute units 38 and/or load/store unit 40.

Figure 4:
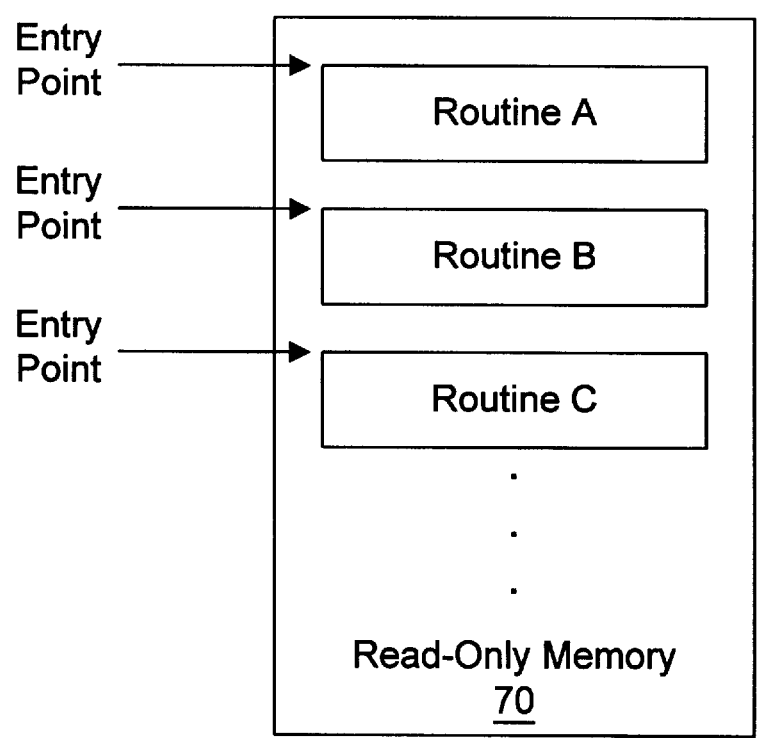
FIG. 4 is a diagram of a read-only memory included within one embodiment of the microcode unit shown in FIG. 3.

Turning now to FIG. 4, a diagram showing an exemplary memory map of read-only memory 70 is shown. In the example shown in FIG. 4, a plurality of routines are stored within read-only memory 70. Routines A, B, and C are shown, each with its own entry point. Routines A, B, and C (as well as other routines not shown) may be freely intermixed between instruction emulation routines and functions such as DSP functions. When more than one routine is included within read-only memory 70, read-only memory 70 can be seen to provide a "library" of routines. As used herein, a library of routines refers to one or more routines which are accessible via particular instructions. The routines may provide enhanced functionality not previously available within the processor, thereby easing the task of programming a computer system employing the microprocessor. Effectively, new instructions defined to perform a DSP function are added to microprocessor 12.

Figure 5:
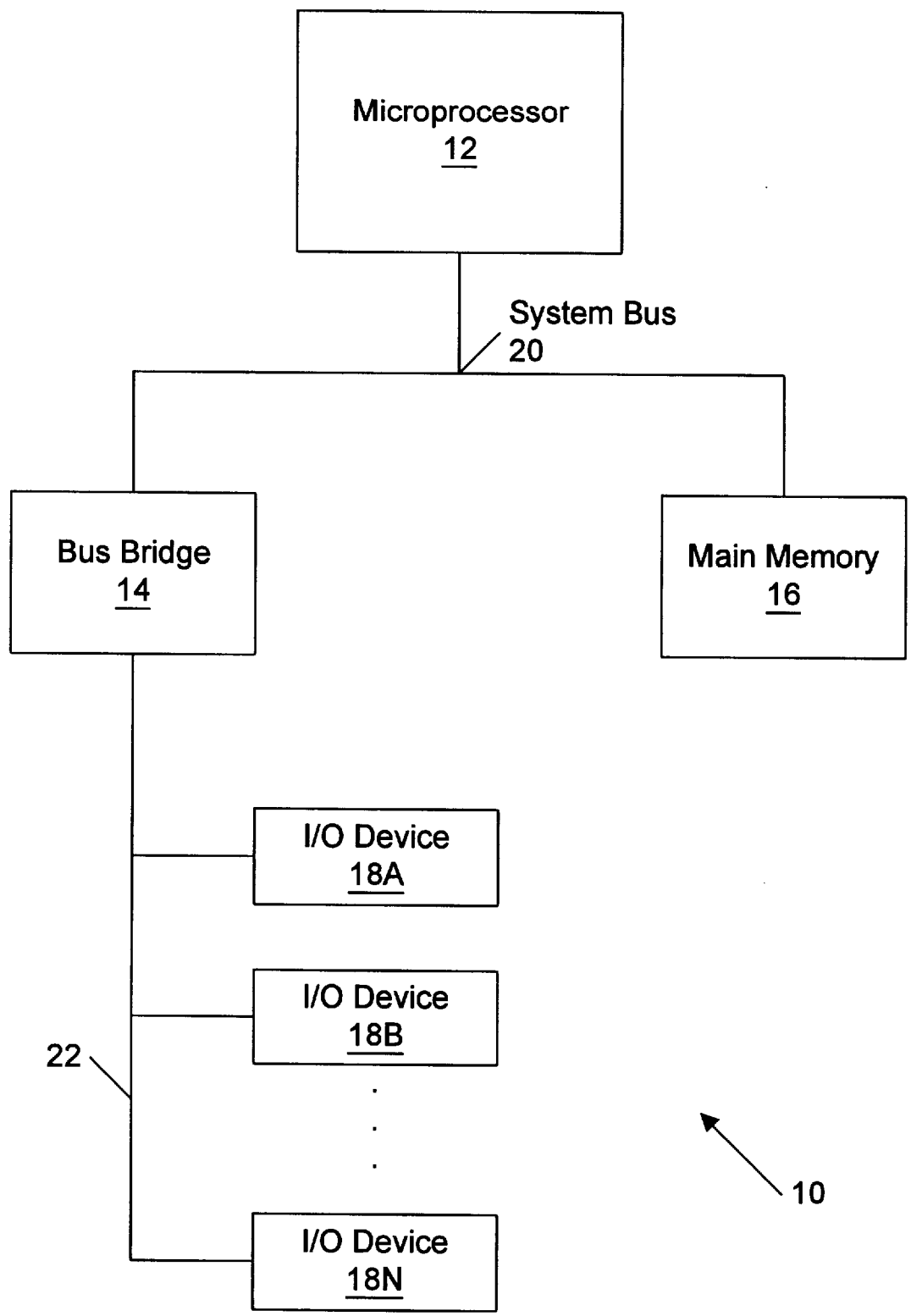
FIG. 5 is a block diagram of a computer system including the microprocessor shown in FIG. 1.

Turning now to FIG. 5, one embodiment of a computer system 10 is shown. Computer system 10 includes microprocessor 12, a bus bridge 14, a main memory 16, and a plurality of input/output (I/O) devices 18A–18N (collectively referred to as I/O devices 18). A system bus 20 couples microprocessor 12, bus bridge 14, and main memory 16. I/O devices 18A–18N are coupled to bus bridge 14 via an I/O bus 22.

Bus bridge 14 is provided to assist in communications between I/O devices 18 and devices coupled to system bus 20. I/O devices 18 typically require longer bus clock cycles than microprocessor 12 and other devices coupled to system bus 20. Therefore, bus bridge 14 provides a buffer between system bus 20 and input/output bus 22. Additionally, bus bridge 14 translates transactions from one bus protocol to another. In one embodiment, input/output bus 22 is an Enhanced Industry Standard Architecture (EISA) bus and bus bridge 14 translates from the system bus protocol to the EISA bus protocol. In another embodiment, input/output bus 22 is a Peripheral Component Interconnect (PCI) bus and bus bridge 14 translates from the system bus protocol to the PCI bus protocol. It is noted that many variations of system bus protocols exist. Microprocessor 12 may employ any suitable system bus protocol.

I/O devices 18 provide an interface between computer system 10 and other devices external to the computer system. Exemplary I/O devices include a modem, a serial or parallel port, a sound card, etc. I/O devices 18 may also be referred to as peripheral devices. Main memory 16 stores data and instructions for use by microprocessor 12. In one embodiment, main memory 16 includes at least one Dynamic Random Access Memory (DRAM) cell and a DRAM memory controller.

It is noted that although computer system 10 as shown in FIG. 5 includes one microprocessor, other embodiments of computer system 10 may include multiple microprocessors similar to microprocessor 12. Similarly, computer system 10 may include multiple bus bridges 14 for translating to multiple dissimilar or similar I/O bus protocols. Still further, a cache memory for enhancing the performance of computer system 10 by storing instructions and data referenced by microprocessor 12 in a faster memory storage may be included. The cache memory may be inserted between microprocessor 12 and system bus 20, or may reside on system bus 20 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

In accordance with the above disclosure, a microcode unit for a microprocessor has been described. The microcode unit advantageously stores DSP functions for use by a program executing upon the microprocessor. The functions need not be explicitly coded. Additionally, the amount of memory required to store the program may be decreased, as a single instruction replaces the plurality of instructions used to perform the function.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   an instruction decode unit configured to receive instructions wherein said instructions include branch instructions each having a branch opcode and a target address value;
   a first execute unit coupled to said instruction decode unit;
   a microcode unit coupled to said instruction decode unit and configured to store a first microcode DSP function;
   wherein said instruction decode unit is further configured to detect said branch opcode of a given branch instruction and, in response to detecting said branch opcode, to either invoke said first microcode DSP function or provide said given branch instruction to said first execute unit which, in response, initiates a subroutine stored in a memory, depending upon said target address value of said given branch instruction.

2. The microprocessor as recited in claim 1 wherein, in response to detecting said branch opcode of said given branch instruction, said instruction decode unit invokes said first microcode DSP function if said target address value is equal to a first value.

3. The microprocessor as recited in claim 2 wherein said instruction decode unit supplies an indication of said target address value of said given branch instruction to said microcode unit to invoke said first microcode DSP function.

4. The microprocessor as recited in claim 2, wherein said microcode unit is configured to store a plurality of microcode DSP functions including said first microcode DSP function, wherein, in response to detecting said branch opcode of said given branch instruction, said instruction decode unit invokes a second of said plurality of microcode DSP functions if said target address value is equal to a second value.

5. The microprocessor as recited in claim 1, wherein said given branch instruction comprises a subroutine CALL instruction.

6. The microprocessor as recited in claim 1, wherein said instruction decode unit is configured to decode said instructions and provide said instructions to said execute unit in decoded form.

7. The microprocessor as recited in claim 1, wherein said microprocessor includes a plurality of execute units coupled to said instruction decode unit, wherein said plurality of execute units includes said first execute unit, wherein said instruction decode unit is configured to decode said instructions and provide said instructions to said plurality of execute units in decoded form.

8. The microprocessor as recited in claim 1, wherein said microprocessor includes an instruction cache configured to store said instructions and to provide said instructions to said instruction decode unit.

9. The microprocessor as recited in claim 1, wherein said microcode unit iteratively fetches code corresponding to said microcode DSP function for iterative execution by said execute unit.

10. A microprocessor comprising:
   an execute unit;
   a microcode unit configured to store a DSP routine;
   a decode unit coupled to said execute unit and to said microcode unit, wherein said decode unit is configured to receive a branch instruction including a target address value and, to either provide said branch instruction to said execute unit which, in response, initiates a subroutine stored in a memory, or invoke said DSP routine, depending upon said target address value.

11. A method for selectively invoking DSP functionality within a microprocessor, wherein the microprocessor includes a microcode unit which stores a microcode DSP function, the method comprising:
   receiving a branch instruction which includes a branch opcode and a target address value;
   detecting said branch opcode and, in response to said detecting said branch opcode, either invoking said microcode DSP function or initiating a subroutine stored in a memory, depending upon said target address value.

* * * * *